(12) United States Patent
Kleinerman

(10) Patent No.: US 12,244,438 B2
(45) Date of Patent: Mar. 4, 2025

(54) SYSTEM AND METHOD FOR DETECTING OF CHANNEL CONDITIONS AND CHANNEL ESTIMATION IN AN ORTHOGONAL FREQUENCY DIVISION MULTIPLEXING (OFDM) RECEIVER

(71) Applicant: Silicon Laboratories Inc., Austin, TX (US)

(72) Inventor: Alexander Kleinerman, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 67 days.

(21) Appl. No.: 18/191,735

(22) Filed: Mar. 28, 2023

(65) Prior Publication Data

US 2023/0239177 A1    Jul. 27, 2023

Related U.S. Application Data

(62) Division of application No. 17/104,063, filed on Nov. 25, 2020, now Pat. No. 11,652,667.

(51) Int. Cl.
*H04L 27/01* (2006.01)
*H04L 5/00* (2006.01)
(Continued)

(52) U.S. Cl.
CPC .......... *H04L 25/0202* (2013.01); *H04L 5/001* (2013.01); *H04L 27/2649* (2013.01)

(58) Field of Classification Search
CPC . H04L 25/0202; H04L 5/001; H04L 27/2649; H04L 25/0224
See application file for complete search history.

(56) References Cited

U.S. PATENT DOCUMENTS 7,469,013 B1    12/2008  Bolt
9,742,611 B2    8/2017   Elenes
(Continued)

FOREIGN PATENT DOCUMENTS

CN    101350800 A  *  1/2009

OTHER PUBLICATIONS

U.S. Appl. No. 17/104,054, filed Nov. 25, 2020, entitled "System and Method for Effgicient Timing Estimation and Tracking in an Orthogonal Frequency Division Multiplexing (OFDM) Communication System," by Alexander Kleinerman, 38 pgs.
(Continued)

*Primary Examiner* — Atique Ahmed
(74) *Attorney, Agent, or Firm* — Trop, Pruner & Hu, P.C.

(57) ABSTRACT

In one aspect, an apparatus includes: a front end circuit to receive and process incoming radio frequency (RF) signals into orthogonal frequency division multiplexing (OFDM) samples; a fast Fourier transform (FFT) engine to receive and convert the OFDM samples into frequency domain sub-carriers; a demodulator to demodulate the frequency domain sub-carriers; a channel estimator to: compute a first pilot channel estimate for a first channel condition comprising a flat channel condition and a second pilot channel estimate for a second channel condition comprising a selective channel condition based on a first set of pilot sub-carriers of the frequency domain sub-carriers; and select one of the first and second pilot channel estimates using the first and second pilot channel estimate; and a control circuit to configure at least the demodulator based at least in part on the selected first or second pilot channel estimate.

20 Claims, 7 Drawing Sheets

(51) Int. Cl.
*H04L 25/02* (2006.01)
*H04L 27/26* (2006.01)

(56) References Cited

U.S. PATENT DOCUMENTS

| | | |
|---|---|---|
| 2003/0008691 A1 | 1/2003 | Chen |
| 2007/0287382 A1 | 12/2007 | Catreaux-Erceg |
| 2008/0123760 A1 | 5/2008 | Oh |
| 2008/0165908 A1* | 7/2008 | Vrcelj ................ H04L 25/0216 375/355 |
| 2008/0212727 A1* | 9/2008 | Jahan ............... H04L 25/03006 375/350 |
| 2009/0052561 A1 | 2/2009 | Baxley |
| 2009/0116568 A1* | 5/2009 | Lindoff ................ H04B 7/086 375/260 |
| 2009/0245092 A1 | 10/2009 | Sampath |
| 2010/0246726 A1* | 9/2010 | Asjadi ................ H04L 27/265 375/346 |
| 2010/0284499 A1 | 11/2010 | Lindoff |
| 2010/0322357 A1 | 12/2010 | Krasny |
| 2013/0208824 A1* | 8/2013 | Wang .................... H04L 5/0048 375/295 |
| 2013/0343499 A1* | 12/2013 | Ren ..................... H04L 25/0234 375/349 |
| 2014/0036984 A1* | 2/2014 | Charbonneau ...... H04L 25/0258 375/233 |
| 2014/0204991 A1 | 7/2014 | Huang |
| 2014/0307824 A1* | 10/2014 | Shen ...................... H04L 27/01 375/267 |
| 2018/0013592 A1 | 1/2018 | Liu |
| 2018/0167235 A1 | 6/2018 | Hu |
| 2019/0109747 A1 | 4/2019 | Hessler |

OTHER PUBLICATIONS mathworks.com, "Channel Estimation—Matlab & Simulink," Oct. 10, 2020, 8 pgs.

berkley.edu, "E225C—Lecture 16, OFDM Introduction," Date Unknown, 15 pgs.

* cited by examiner

SYSTEM AND METHOD FOR DETECTING OF CHANNEL CONDITIONS AND CHANNEL ESTIMATION IN AN ORTHOGONAL FREQUENCY DIVISION MULTIPLEXING (OFDM) RECEIVER

CROSS-REFERENCE TO RELATED APPLICATIONS

The present application is a divisional of U.S. patent application Ser. No. 17/104,063, filed on Nov. 25, 2020, the content of which is hereby incorporated by reference.

BACKGROUND

Radio receivers are omnipresent in modern technology. In addition to standalone radios for receipt of broadcast radio signals, all manners of tech and non-tech devices include some type of radio receiver (and often paired with a transmitter). Such modem circuitry is present in any device having wireless capabilities. While some broadcast radio signals are transmitted with analog coding (e.g., conventional AM and FM signals), other terrestrial and satellite wireless communication systems use some type of digital encoding. Some example digital radio systems include National Radio System Committee (NRSC-5C, also known as HD™ radio), Digital Audio Broadcasting (DAB), Digital Radio Mondiale (DRM) or other standard.

Channel estimation is an operation performed in a receiver to determine channel conditions. In one example digital radio communication system, message information is communicated in orthogonal frequency division multiplexing (OFDM) symbols. A conventional technique to perform channel estimation in such a system involves using a static channel detector that operates the same regardless of actual channel conditions. As a result, some performance degradation occurs when conditions vary from typical conditions.

SUMMARY OF THE INVENTION

In one aspect, an apparatus includes: a front end circuit to receive incoming radio frequency (RF) signals and process the incoming RF signals into orthogonal frequency division multiplexing (OFDM) samples of a plurality of OFDM symbols; a fast Fourier transform (FFT) engine coupled to the front end circuit, the FFT engine to receive the plurality of OFDM samples and convert the plurality of OFDM samples into a plurality of frequency domain sub-carriers; a demodulator coupled to the FFT engine to demodulate the plurality of frequency domain sub-carriers; a channel estimation circuit coupled to the FFT engine, wherein the channel estimation circuit is to determine a first channel estimate based on a first set of pilot sub-carriers of the plurality of frequency domain sub-carriers and a second channel estimate based on the first set of pilot sub-carriers, and select one of the first channel estimate and the second channel estimate; and a control circuit coupled to the channel estimation circuit to control a configuration of the demodulator based at least in part on the selected channel estimate.

In an example, the channel estimation circuit is to select the one of the first channel estimate and the second channel estimate based at least in part on noise estimate information. The channel estimation circuit may determine the noise estimate information comprising a first noise estimate determined using the first channel estimate and a second noise estimate determined using the second channel estimate. The channel estimation circuit may select the one of the first channel estimate and the second channel estimate associated with a lowest one of the first noise estimate and the second noise estimate. The channel estimation circuit may determine a first data channel estimate based at least in part on the first channel estimate comprising a first pilot channel estimate and determine a second data channel estimate based at least in part on the second channel estimate comprising a second pilot channel estimate.

In an example for Digital Radio Mondiale (DRM), the channel estimation circuit is to: determine the first channel estimate and the second channel estimate using a plurality of gain reference pilot frequency domain sub-carriers having known modulation points; determine the first noise estimate using the first channel estimate and a plurality of timing and frequency reference pilot frequency domain sub-carriers having known modulation points; and determine the second noise estimate using the second channel estimate and the plurality of timing and frequency reference pilot frequency domain sub-carriers having known modulation points. The channel estimation circuit may determine the first noise estimate further using the first channel estimate and Fast Access Channel (FAC) frequency domain sub-carriers having quadrature phase shift keying modulation. The channel estimation circuit may determine the second noise estimate further using the second channel estimate and the FAC frequency domain sub-carriers having quadrature phase shift keying modulation. The channel estimation circuit may select one of the first pilot channel estimate and the second pilot channel estimate based at least in part on a comparison between the first noise estimate and the second noise estimate. The control circuit may control the configuration of the demodulator comprising to control a soft decision calculation of the demodulator.

In another aspect, a method includes: receiving, in a receiver, a RF signal; processing, in the receiver, the RF signal to obtain a plurality of OFDM symbols, each of the plurality of OFDM symbols comprising a plurality of sub-carriers; computing a first pilot channel estimate and a second pilot channel estimate based on a first set of pilot sub-carriers of the plurality of sub-carriers; determining a first noise estimate using the first pilot channel estimate and a second set of pilot sub-carriers of the plurality of sub-carriers; determining a second noise estimate using the second pilot channel estimate and the second set of pilot sub-carriers; selecting one of the first pilot channel estimate and the second pilot channel estimate based at least in part on a comparison between the first noise estimate and the second noise estimate; and configuring at least a demodulator of the receiver based at least in part on the selected first or second pilot channel estimate.

In an example, the method further comprises computing the first pilot channel estimate for a flat channel. The method may further include computing the second pilot channel estimate for a selective channel. The method further may include selecting the one of the first pilot channel estimate and the second pilot channel estimate associated with a lower one of the first noise estimate and the second noise estimate. The method also may include computing a first data channel estimate based at least in part on the first pilot channel estimate and determining the first noise estimate further based on the first data channel estimate. The method also may include computing a second data channel estimate based at least in part on the second pilot channel estimate and determining the second noise estimate further based on the second data channel estimate.

In another aspect, an apparatus comprises: means for amplifying a RF signal; mixer means for downconverting the RF signal to a second frequency signal; digitizer means coupled to the mixer means for digitizing the second frequency signal into samples of a plurality of OFDM symbols; transform means for converting the plurality of samples into a plurality of frequency domain sub-carriers; channel estimation means coupled to the transform means, the channel estimation means for determining selective channel pilot channel estimates for a selective channel using at least some pilot sub-carriers of the plurality of frequency domain sub-carriers and flat channel pilot channel estimates for a flat channel using the at least some pilot sub-carriers; and demodulator means coupled to the transform means for demodulating the plurality of frequency domain sub-carriers based at least in part on at least one of the selective channel pilot channel estimates and the flat channel pilot channel estimates.

In an example, the channel estimation means is to determine first data channel estimates based at least in part on the selective channel pilot channel estimates and determine second data channel estimates based at least in part on the flat channel pilot channel estimates. The channel estimation means may determine first noise estimates based at least in part on the first data channel estimates and determine second noise estimates based at least in part on the second data channel estimates. The channel estimation means may determine a first noise power estimate based at least in part on the first noise estimates and determine a second noise power estimate based at least in part on the second noise estimates. The apparatus further may include control means coupled to the channel estimation means for controlling a configuration of the demodulator means based at least in part on one or more of the first noise power estimate and the second noise power estimate. The demodulator means may calculate soft decisions for the plurality of frequency domain sub-carriers according to at least one of the first data channel estimates and the second data channel estimates.

DETAILED DESCRIPTION

Figure 1A:
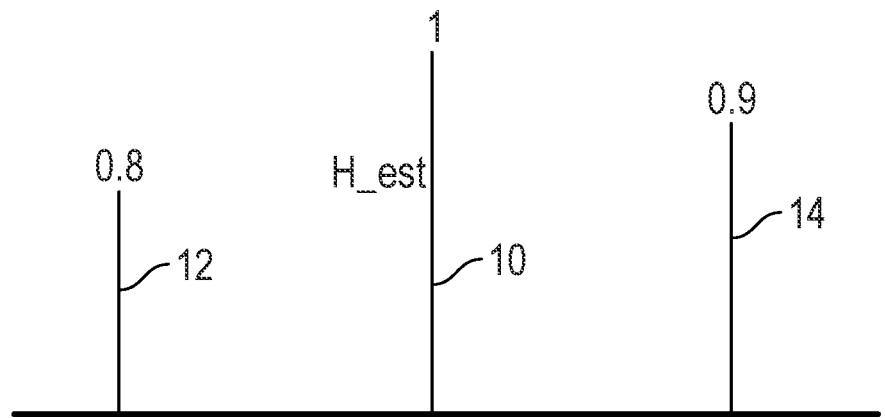
FIG. 1A is a graphical illustration of multiple adjacent pilot symbols.

In various embodiments, a radio receiver is implemented with a channel estimation control circuit that is configured to efficiently estimate a channel for an incoming radio frequency (RF) signal. More specifically, the channel estimation control circuit may perform channel estimation according to multiple techniques to identify prevalent channel conditions. Embodiments may be used in a variety of receiver implementations for use in determining the channel estimate for incoming OFDM communications. While embodiments are not limited in this regard, implementations may be used in connection with a Digital Radio Mondiale (DRM) digital radio communication system in accordance with a given DRM specification. Other implementations can be used in connection with other digital communication techniques, including digital TV (e.g., one or more Digital Video Broadcasting (DVB)) standards, Integrated Digital Services Broadcasting (IDSB), cellular techniques such as Long Term Extension (LTE) and 5G, or other receivers using OFDM signaling.

While a channel estimation control circuit can be implemented in different manners, in embodiments herein this circuit may be implemented as a feedforward circuit that receives downconverted digitized symbols in the frequency domain (after conversion from the time domain to the frequency domain). Further, in different implementations this circuit may control one or more components of the receiver based on a determined channel estimate.

An OFDM signal is processed mostly in the frequency domain. Due to the properties of OFDM modulation in which message information includes a cyclic prefix and message content, each signal can be presented as:

$$Y_i = X_i H_i + N_i \quad \text{[Equation 1]}$$

where:
Y_i is the complex value of an input signal at frequency i,
H_i is the complex value of the channel at frequency i,
X_i is the complex value of the transmitted modulation symbol i, and N_i is the complex gaussian noise sample.

The goal of channel estimation is to estimate $H_i$ for every data cell on a time-frequency grid. In an OFDM symbol stream, pilot symbols are reference signals at known locations, and channel estimations in these locations are called pilot channel estimations. Channel estimates for data cells can be obtained by interpolating between these pilot channel estimates. For this pilot symbol, the signal equation is:

$$Y_i = P_i H_i + N_i \quad \text{[Equation 2]}$$

where Pi is a pilot signal.

One technique to estimate a pilot channel is according to a least squares (LS) estimation, as in Equation 3.

$$\hat{H}_{LS}(n) = \left(P(n)^H P(n)\right)^{-1} P(n)^H Y(n) = \frac{Y(n)}{P(n)} \quad \text{[Equation 3]}$$

While this technique is unbiased and easy to compute, it does not result in a minimum error variance.

Another technique is a minimum mean square error (MMSE) estimation (assuming white noise for $N_i$) according to Equation 4.

$$\hat{H}_{MMSE}(n) = \left(P(n)^H P(n) + \sigma^2\right)^{-1} P(n)^H Y(n) = \frac{Y(n) P*(n)}{|P|^2(n) + \sigma^2} \quad \text{[Equation 4]}$$

This technique is biased, but results in a minimum error variance. However a noise $\sigma^2$ variance estimation needs to be computed.

For particular radio standards, certain signal impairments may occur. For example in a DRM system, during daylight hours, a receiver may experience flat fading due to the narrow spectrum of the DRM signal (5-20 kHz bandwidth only). Selective fading happens mainly at night due to skywave propagation. This means that radio waves transmitted at an angle into the sky can be reflected back to Earth beyond the horizon, at great distances, even several hundred miles.

Different channel estimate techniques may be more amenable to these different channel conditions. As such, embodiments may perform channel estimation according to multiple techniques to identify channel conditions, and select a most appropriate estimate for the conditions. In this way, a performance improvement may be realized a significant amount of time. For example in a DRM implementation, 0.5-0.8 dB performance improvement may be observed in flat fading channels. At the same time, there is no degradation in selective fading. Thus with embodiments, one technique that works better than a conventional technique is used for one type of channel condition (flat), and which is used only when channel conditions for which this technique works are detected. In this way, performance improvements may be realized for particular channel conditions without degrading performance for other channel conditions.

In performing channel estimates using pilots, a pilot smoothing process can be performed. In this case assuming that pilots adjacent to a target pilot can be used for target pilot channel estimation, the highest weight can be given to a target pilot, and lower weights to adjacent pilots.

Referring now to FIG. 1A, shown is a graphical illustration of multiple adjacent pilot symbols. As shown in FIG. 1A, these pilots may be received with different strengths due to channel conditions and noise. As such, a pilot smoothing process may be performed. As shown in FIG. 1A, a target pilot 10 may have a greatest magnitude, e.g., having an amplitude of 1.0, while adjacent pilots 12 and 14 may have lower amplitudes, e.g., 0.8 and 0.9. With these received pilots, a pilot smoothing process may be performed by averaging the pilots using different weighting coefficients. In an embodiment this pilot smoothing may occur, e.g., with weights of 0.1; 1; 0.1, respectively for pilots 12, 10 and 14. In this case and with reference to FIG. 1A, a channel estimate (H_est) may be calculated to be: (0.8*0.1+1+ 0.9*0.1)/1.2=0.975.

Figure 1B:
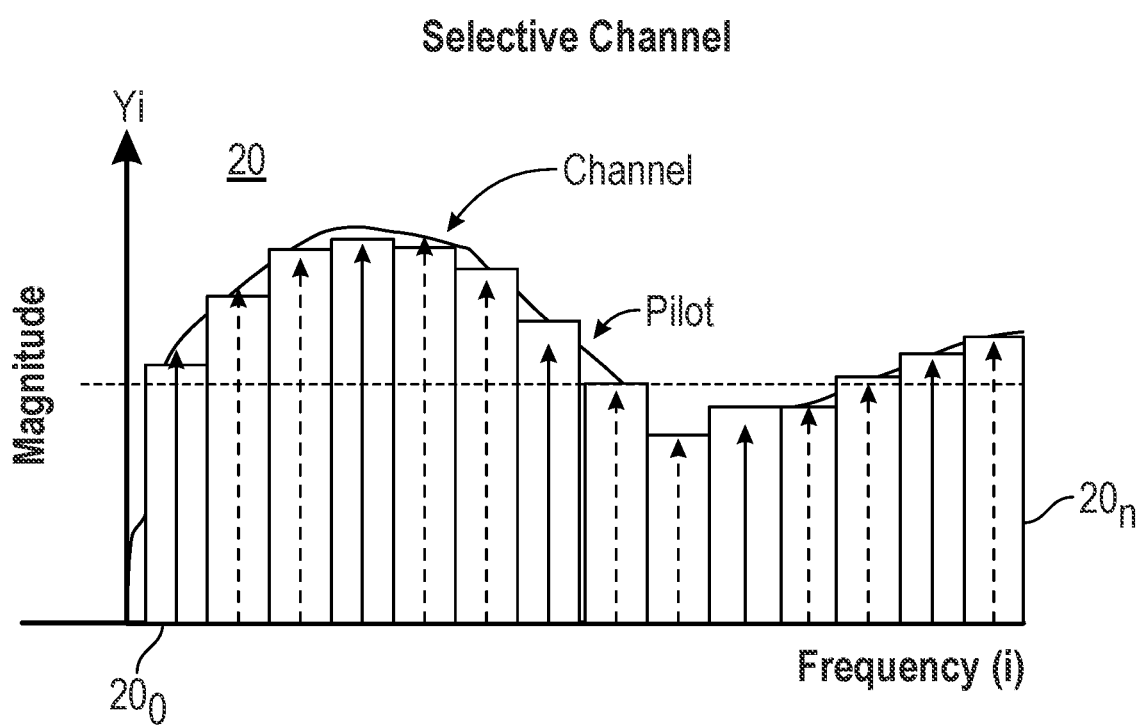
FIG. 1B is a graphical illustration of a received signal via a selective channel.

Referring now to FIG. 1B, shown is a graphical illustration of a received signal via a selective channel. As shown in FIG. 1B, an OFDM symbol 20, after conversion to the frequency domain, includes a plurality of sub-carriers $20_0$-$20_n$. Given a selective channel, sub-carriers 20 have different magnitudes. As a result, embedded pilot symbols within this channel have different magnitudes.

Figure 1C:
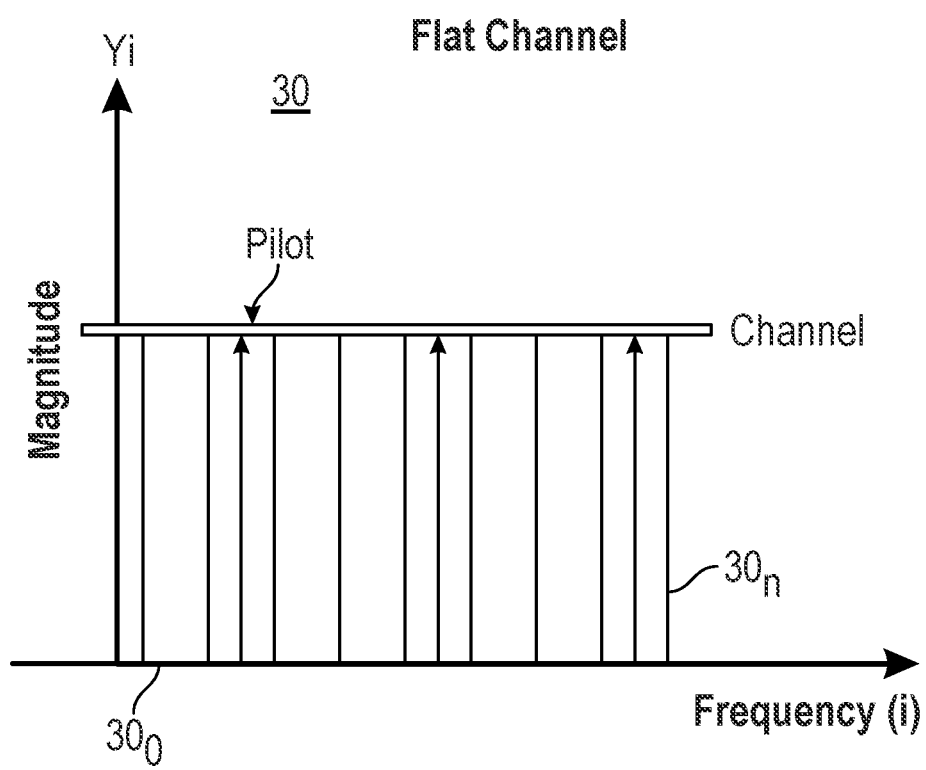
FIG. 1C is a graphical illustration of a received signal via a flat channel.

In contrast, as shown in FIG. 1C, which is a graphical illustration of a received signal via a flat channel, sub-carriers $30_{0-n}$ may have at least substantially the same magnitude. While described and shown with flat channels for DRM communications, embodiments also may be used with channels that are almost flat or change very slowly from pilot to pilot.

In embodiments, given these different channel conditions as shown in FIGS. 1B and 1C, multiple channel estimation techniques can be performed based on pilot positions. More specifically, a selective channel pilot channel estimation can be performed in accordance with Equation 5.

$$\hat{H}_{LS}(n) = \frac{Y(n)}{P(n)} \quad \text{[Equation 5]}$$

And a flat channel pilot channel estimation can be performed in accordance with Equation 6.

$$\hat{H}(n) = \sum_{i=n-L}^{i \leq n+L} a(i) * \hat{H}_{LS}(i) \quad \text{[Equation 6]}$$

Note that the coefficient a(i) could be chosen according to polynomial fit or can be set equal to 1/(2L+1), where L is a number of samples that is controllable to account for the amount of flatness of the channel, meaning that the channel is fairly constant in the interval of 2*L samples or that 2L samples statistically fit the model. Different techniques may be used to choose a(i). For example, one technique to find optimal smoothing coefficients is Savitzky-Golay filtering, where +/−L data points are used to smooth (estimate) a data point in the middle using a polynomial fit of the K degree. In an embodiment, a polynomial of minimal degree (linear fit) may be used where the result is an average of all points, i.e., a moving average. Other known smoothing techniques can be used to find adjacent pilot symbol coefficients, such as for example: kernel, locally weighted scattershot smoothing (LOWESS) or other smoothing technique. For example, a Savitzky-Golay quadratic or cubic polynomial fit technique using, e.g., +/−3 adjacent pilots can be used in pilot channel estimation. In this case while performance may be slightly worse when estimating a real flat channel, performance may be improved for low spread delay channels (or almost flat or slowly changing channels).

Regardless of the channel estimates, noise estimation also may be performed. Such noise estimation may be performed using known reference values other than pilots that were used for channel estimation. In a general case, pilots can be divided into two sub-groups, with a first sub-group to be used for pilot channel estimation and a second sub-group to be used for noise estimation. In a DRM case gain pilots can be used for channel estimation, while time reference and frequency reference pilots can be used for noise estimation. In some cases a decision directed approach can be used to estimate reference values, for example, if some carriers are modulated with quadrature phase shift keying (QPSK) symbols or with binary phase shift keying (BPSK) symbols.

Note however that embodiments are not limited in this regard, and other reference cells can be used for performing channel estimations as described herein. In the particular DRM implementation herein, DRM pilots, more generally gain reference cells are used for channels estimation. In turn, frequency reference cells and time reference cells that have known complex values can be used for noise estimations. Also, FAC cells, which are the control channel transmitted in QPSK (and thus may have one of four possible values), can also be used for noise estimation. In other OFDM communication implementations, there may not be frequency and time reference cells (or only one of them), and there may or may not be low key modulated (BPSK or QPSK) control channel cells. Yet embodiments may still apply using different sets of available reference cells.

Figure 2:
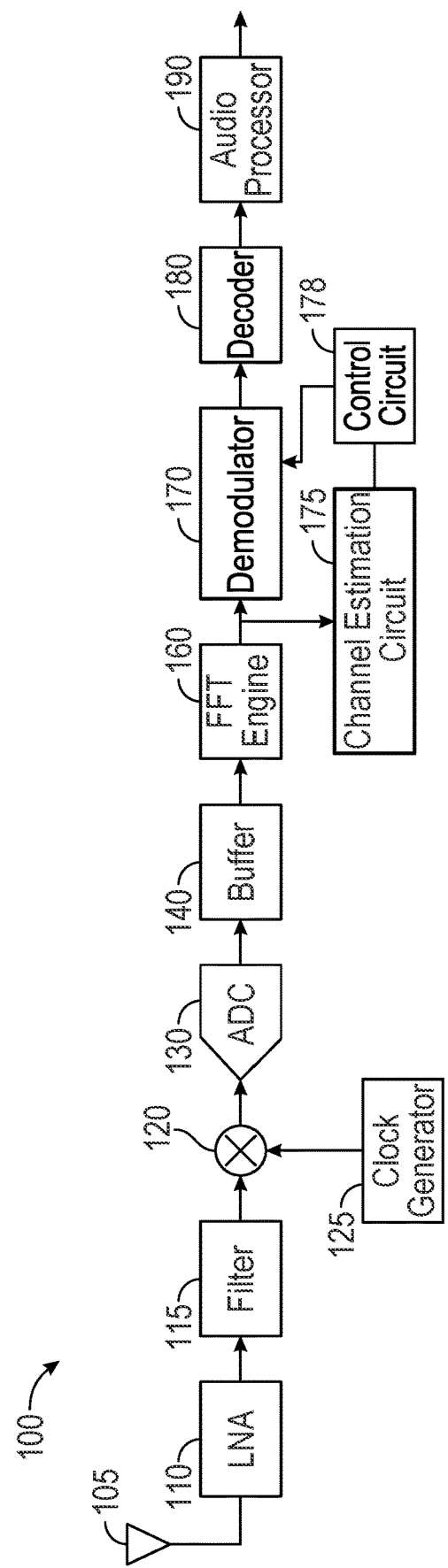
FIG. 2 is a block diagram of a receiver in accordance with an embodiment.

Referring now to FIG. 2, shown is a block diagram of a receiver in accordance with an embodiment. As shown in FIG. 2, receiver 100 may include a signal processing path having various components. Embodiments can be incorporated in different types of receiver systems. In some embodiments, receiver 100 may be a single-die integrated circuit such as a CMOS die having mixed signal circuitry including both analog and digital circuitry.

With reference to receiver 100, an incoming RF signal that includes digital radio signals according to a given digital broadcast specification may be received over the air via an antenna 105. As used herein, the terms "digital radio" or "digital radio broadcast signal" are used interchangeably and are intended to correspond to broadcast radio communication that occurs digitally. Such communications may be in accordance with various standards such as a HD™ radio, DAB, DRM, cellular, digital TV, or other standard.

As shown in FIG. 2, an incoming RF signal received via antenna 105 is provided to a low noise amplifier (LNA) 110, which amplifies the RF signal. In turn, LNA 110 is coupled to a filter 115, which may perform filtering of the received RF signal. Understand while shown with two RF front end blocks, a receiver may include additional RF front end circuitry in other examples. In turn, the filtered RF signal is provided to a mixer 120, which in an embodiment may be implemented as a complex mixer. In embodiments herein mixer 120 may downconvert the RF signal to a lower frequency signal using a mixing signal received from a clock generator 125. In an embodiment, clock generator 125 may be implemented as a local oscillator, phase lock loop or other such clock generation circuit. In a particular embodiment, this lower frequency signal may be, e.g., a low-intermediate frequency (IF) or zero-IF signal. This downconverted signal is an in-phase/quadrature phase (10) signal.

The resulting downconverted signal is provided to an analog-to-digital converter (ADC) 130, where the signal can be digitized into a digital signal. Note that in some embodiments, either before or after digitization, channelization may be performed to generate a channelized signal. In an OFDM system, a plurality of samples forms an OFDM symbol of an incoming data stream.

In turn, samples are provided to a buffer 140, which may be implemented as a first in first out (FIFO) 140. The incoming samples are stored in buffer 140, and are then output to a main digital signal processing path including a fast Fourier transform (FFT) engine 160, which generates frequency domain OFDM symbols from incoming time domain OFDM symbols. In one embodiment, each incoming time domain OFDM symbol can be processed by FFT engine 160 into a plurality of sub-carriers. Note that the number of sub-carriers corresponding to a given OFDM symbol may vary depending upon a particular radio standard, bandwidth of the signal and time duration of the OFDM symbol (without cyclic prefix).

As further shown in FIG. 2, frequency domain sub-carriers generated in FFT engine 160 also may be provided to a channel estimation circuit 175. In embodiments herein, channel estimation circuit 175 may be a dedicated hardware circuit or a microcontroller or other control logic to execute instructions stored in a non-transitory storage medium such as firmware and/or software instructions. Channel estimation circuit 175 may perform multiple channel estimations as described herein. More particularly, channel estimation circuit 175 may perform channel estimations for at least flat channel conditions and selective channel conditions, and slowly changing almost flat channels.

These channel estimates then may be used to determine noise estimates for these different channels. Then based at least in part on such noise estimates, a given one of the channel estimates may be selected and used for further processing. More specifically as described herein, the selected channel estimate may be used for purposes of configuring certain receiver components. In one embodiment, the selected channel estimate may be provided to a control circuit 178. In different implementations, control circuit 178 may be a dedicated hardware circuit or a microcontroller or other control logic to execute stored instructions. Based at least in part on this estimate of channel conditions, control circuit 178 may configure demodulator 170. For example, in one embodiment control circuit 178 may configure a slicing operation within a demodulator 170. This slicing operation provides as input bits (or hard decisions) to decoder error correction circuitry. Alternately, soft decisions that are proportional to probability of each bit decision can be calculated based on the configuration of demodulator 170. Also note that while separate channel estimation and control circuits are shown in FIG. 2, in other implementations there may be a single circuit to determine estimates and configure receiver components based at least in part on the estimates.

The sub-carrier outputs from FFT engine 160 form a frequency domain symbol that in turn is provided to demodulator 170, which may demodulate the incoming sub-carriers and provide demodulated sub-carriers. In an embodiment, demodulator 170 may be a sub-symbol decoder to produce a soft bit per sub-carrier. In turn, the demodulated sub-carriers may be provided to a decoder 180, where error correction and information bit extraction is performed. The resulting demodulated signal may be provided to an audio processor 190 for audio processing. The encoded audio signal is then provided to an audio source decoder (not shown for ease of illustration in FIG. 2) to generate source audio. Although shown as individual components, understand that portions of the receiver after ADC 130 to the end of the signal processing path of FIG. 2 can be implemented in a digital signal processor (DSP).

While described with this particular embodiment in FIG. 2, other implementations are possible, and additional circuitry can be present. For example, in some embodiments, additional circuitry including a deinterleaver, depuncturer, and a forward error correction (FEC) decoder may be present, to strip parity bits and provide the information bits. In another embodiment, a channel estimate control circuit may be configured in other types of hardware, may be realized via combinations of hardware, firmware, and/or software, and also may be implemented within a microcontroller or DSP.

Figure 3:
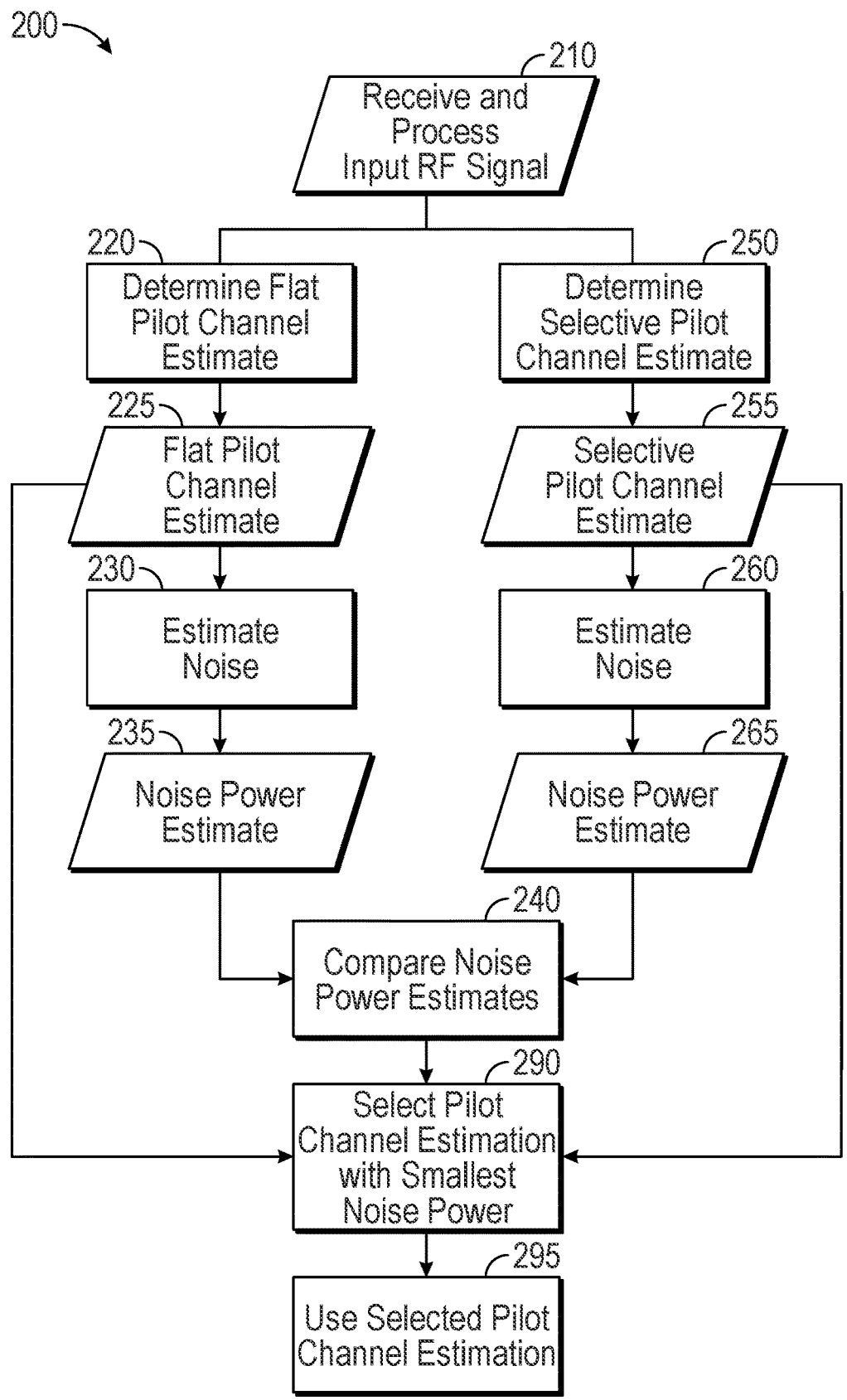
FIG. 3 is a flow diagram of a method in accordance with an embodiment.

Referring now to FIG. 3, shown is a flow diagram of a method in accordance with an embodiment. More specifically as shown in FIG. 3, method 200 is a method for performing a channel estimate in a receiver. As such, method 200 may be performed by hardware circuitry of a receiver, alone or in combination with firmware and/or software. In an embodiment, method 200 may be performed by receiver circuitry, including a channel estimation circuit.

As illustrated, method 200 begins by receiving an input RF signal (block 210). Note that this signal may be received in a receiver and processed, e.g., amplified, filtered, down-converted and so forth. In addition, prior to the channel estimation being performed, the incoming signal may be converted from the time domain to the frequency domain, e.g., in an FFT engine.

Then as further illustrated, pilot channel estimation may be performed in multiple independent paths. As an example, at least some target pilots can be used for performing a flat pilot channel estimate (at block 220). In one embodiment, pilot channel estimation for a flat channel can be performed in accordance with Equation 6, described above. The resulting flat channel pilot estimate (block 225) can be held (e.g., stored in a buffer) pending a determination of which type of channel estimate to use.

Still with reference to FIG. 3, next at block 230, a noise estimation may be performed based at least in part on the flat pilot channel pilot estimate. To this end, other pilots of the received input signal that are not used for the channel estimate can be used for purposes of noise estimation to obtain a first noise estimate (block 235). In one embodiment, this noise estimation may be performed as described further below.

Note that a similar determination of channel and noise estimates may be performed at blocks 250-265 for a selective channel estimate processing. In this instance at block 250 the selective channel pilot estimate may be determined in accordance with Equation 5 above, and then a second noise estimation may be performed at block 260 to obtain a second noise estimate (block 265).

Then at block 240, the two noise power estimates can be compared, e.g., in a comparison logic to determine which noise estimate is the smaller value. Thereafter at block 290, the channel estimate associated with the smallest noise power can be used as the selected pilot channel estimate. Thus at block 295, the pilot channel estimate that is selected can be provided to a control circuit. Based at least in part on this channel estimate, the control circuit may configure various components of a receiver, e.g., a demodulator. Although shown at this high level in the embodiment of FIG. 3, many variations and alternatives are possible.

Figure 4:
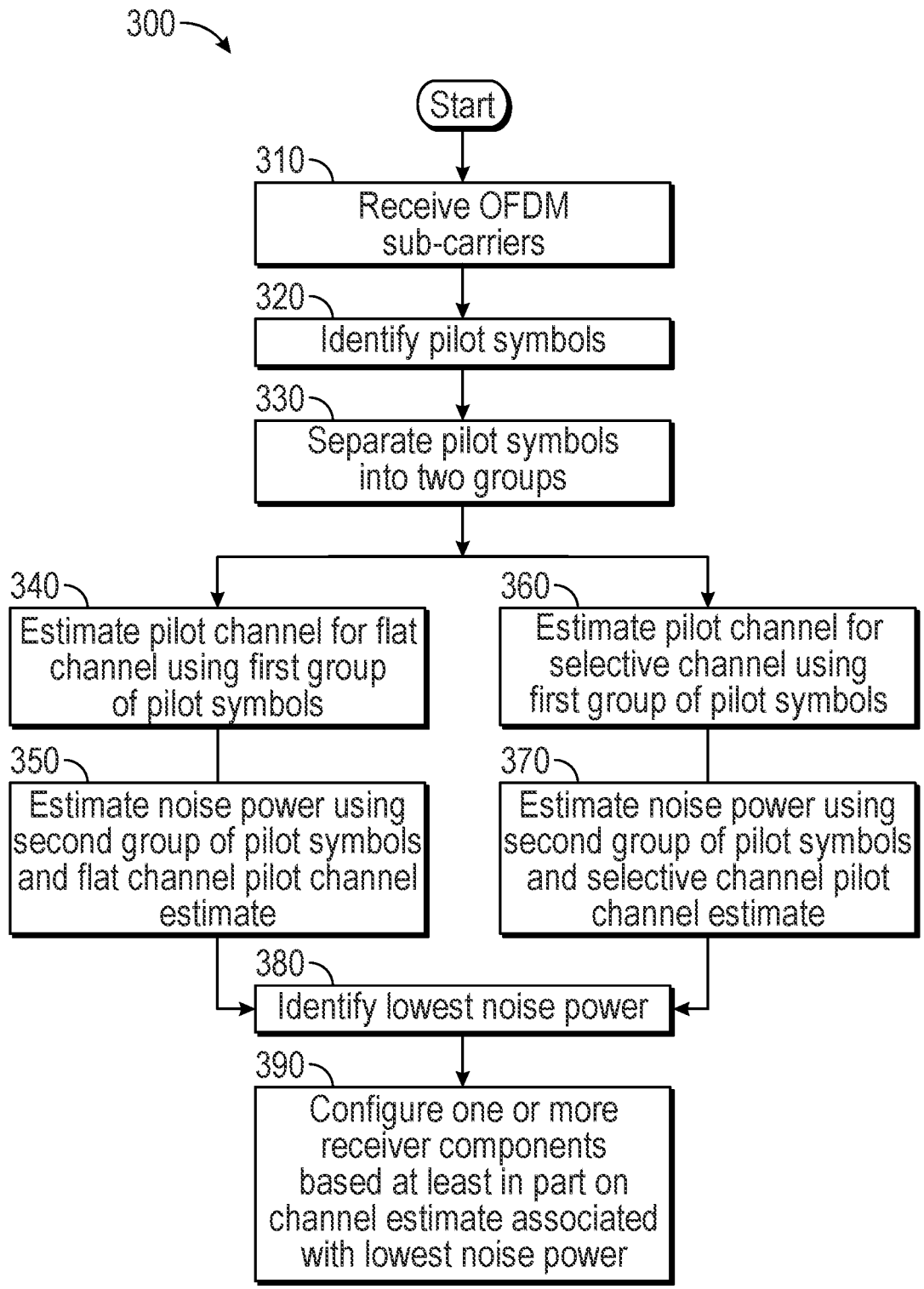
FIG. 4 is a flow diagram of a method in accordance with another embodiment.

Referring now to FIG. 4, shown is a flow diagram of a method in accordance with another embodiment. More specifically, method 300 of FIG. 4 describes a more detailed technique for generating and using multiple channel estimates in accordance with an embodiment. As such, method 300 may be performed by hardware circuitry of a receiver, alone or in combination with firmware and/or software such as a combination of a channel estimation circuit and a control circuit.

As shown, method 300 begins by receiving OFDM sub-carriers (block 310). The sub-carriers may include multiple types of pilot symbol information as well as data symbols, control symbols and so forth. From the received sub-carriers at block 320 a set of pilot symbols may be identified. In an embodiment, pilot symbols may be determined based on a pilot pattern according to a given specification, typically at some predetermined interval in time and in frequency. Next at block 330 the pilot symbols may be separated into (at least) two groups. For example, in a DRM implementation incoming pilot symbols may include various reference signal information including so-called gain reference pilots and time and frequency reference pilots. Note that the channel estimation circuit may include buffering capabilities or be coupled to such buffer to enable buffering of this sub-carrier information.

Still with reference to FIG. 4, multiple paths may proceed. Specifically, a first group of pilot symbols, which in an embodiment may be gain pilots, may be used to calculate channel estimations. More specifically at block 340 a pilot channel estimate for a flat channel may be determined using this first group of pilot symbols. In an embodiment, this flat channel pilot channel estimation may be calculated in accordance with Equation 6, discussed above. Next at block 350 a noise estimate may be determined. More specifically, noise power may be estimated using the second group of pilot symbols, which in a DRM implementation may be time and frequency reference pilots. Still further, the noise power estimate may be determined further using the flat channel pilot channel estimate.

Still with reference to FIG. 4, at blocks 360 and 370, similar channel and noise estimates may be determined for a selective channel. Here at block 360 a pilot channel estimate for a selective channel may be determined using the first group of pilot symbols. In an embodiment, this selective channel pilot channel estimate may be calculated in accordance with Equation 5, discussed above. Next at block 370 a noise estimate may be determined using the second group of pilot symbols and further using the selective channel pilot channel estimate.

Referring still to FIG. 4, control next passes to block 380 where a lowest noise power of the two noise estimates can be identified. For example, comparison logic may make this determination. Understand while two noise estimates resulting from two channel estimates are determined in this embodiment, in still further implementations additional channel and noise estimates may be determined in accordance with other techniques. For example in a DRM modem implementation, an averaged noise estimation (e.g., over the last 10 to 100 OFDM symbols) or a filtered noise estimation may be used for comparison, so the NoiseForComparison (i)=alpha*Noise(i)+NoiseForComparison(i−1)*(1−alpha); where alpha, au be in a [0.01 to 0.1] range.

Then at block 390, one or more receiver components can be configured based at least in part on the channel estimate associated with the lowest noise power. For example, various configuration settings of a demodulator, such as slicing thresholds or other configuration parameters may be determined and applied to the components, such as for performing soft decision calculations.

Figure 5:
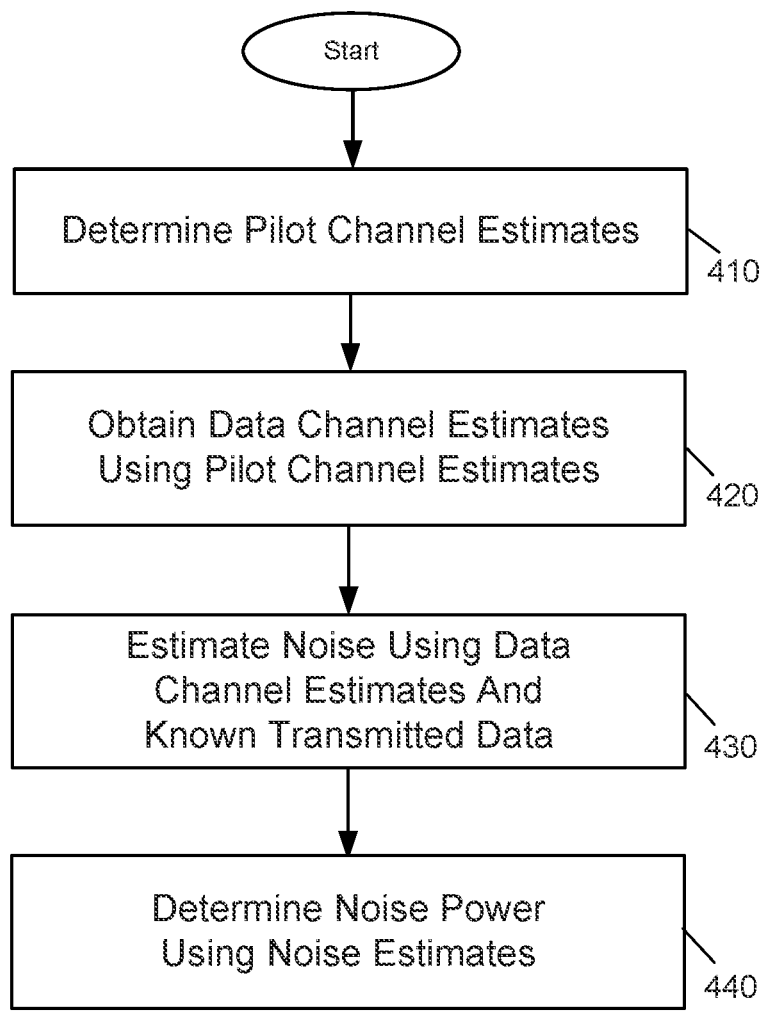
FIG. 5 is a flow diagram of a method in accordance with yet another embodiment.

Referring now to FIG. 5, shown is a flow diagram of a method in accordance with yet another embodiment. More specifically, method 400 of FIG. 5 is a method for determining a noise estimate. In an embodiment, a channel estimation circuit may perform method 400.

As illustrated, method 400 begins by obtaining a pilot channel estimate (block 410). Note that as there are multiple pilot channel estimates determined in an embodiment, method 400 may be performed for all such pilot channel estimates. These pilot channel estimates may be determined as described above with regard to a given one of Equations 5 and 6, in an embodiment. Control next passes to block 420 where data channel estimates may be obtained using the pilot channel estimates. In one embodiment, the data channel estimates may be determined for all data carriers, by interpolation between pilot channel estimates.

Still with reference to FIG. 5, control next passes to block 430 where a noise estimation may be performed. More specifically, such noise estimates may be determined using the data channel estimates and known transmitted data, e.g., according to Equation 7, below. Note that in systems such as DRM where additional known data is transmitted, these additional points can be taken from time and frequency reference symbols, and also from additional QPSK FAC data carriers (using a decision directed method which checks which of 4 modulation points gives the smallest error (using Equation 7, below)).

Finally, control passes to block 440 where a noise power can be determined using these noise estimates. In an example, the smallest error determined above can be used to determine a noise estimation according to Equation 8, below. The value of the data carrier used for noise estimation is Xi in Equation 7, the data channel estimate received from interpolation is Hi, and the received signal carrier value is Yi.

In an embodiment noise estimates may be determined using data channel estimates. Such noise estimate determination may be calculated in accordance with Equation 7, below.

$$N_i = Y_i - X_i H_i \quad \text{[Equation 7]}$$

And in turn, noise power can be estimated using Equation 8.

$$P_{noise} = \Sigma_i |N_i|^2 \quad \text{[Equation 8]}$$

In yet another embodiment, to make the detector more robust, noise power may be determined using Equation 9.

$$P_{noise(current)} = (1-alpha) \cdot P_{noise(previous)} + alpha \cdot P_{noise} \quad \text{[Equation 9]}$$

where alpha can be chosen empirically with a typical range [0.01 to 0.1].

Understand while shown at this high level in the embodiment of FIG. 5, many variations and alternatives are possible. For example in other systems where only pilots are available as known data, all of them are used for data channel estimation, and there is no data to estimate noise. In this case, if every odd pilot is used for channel estimation and every even pilot is used for noise estimation, and then the opposite, noise can be estimated for this case too.

Figure 6:
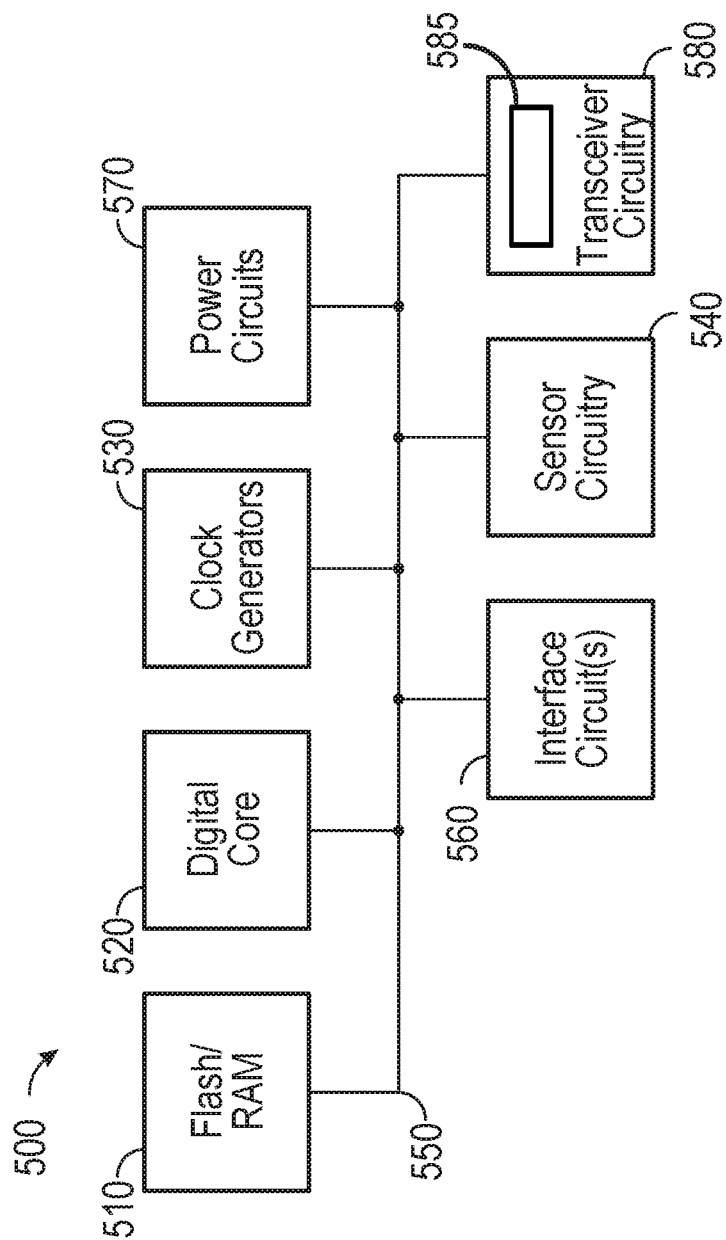
FIG. 6 is a block diagram of a representative wireless device in accordance with an embodiment.

Embodiments may be implemented in many different types of end node devices. Referring now to FIG. 6, shown is a block diagram of a representative device 500 which may be a given wireless device. In the embodiment shown in FIG. 6, device 500 may be a standalone radio, or a radio incorporated into another device such as a sensor, actuator, controller or other device that can be used in a variety of use cases in a wireless control network, including sensing, metering, monitoring, embedded applications, communications applications and so forth.

In the embodiment shown, device 500 includes a memory system 510 which in an embodiment may include a non-volatile memory such as a flash memory and volatile storage, such as RAM. In an embodiment, this non-volatile memory may be implemented as a non-transitory storage medium that can store instructions and data, including code for performing methods including the methods of FIGS. 3-5.

Memory system 510 couples via a bus 550 to a digital core 520, which may include one or more cores and/or microcontrollers that act as a main processing unit of the device. As further shown, digital core 520 may couple to clock generators 530 which may provide one or more phase locked loops or other clock generation circuitry to generate various clocks for use by circuitry of the device.

As further illustrated, device 500 further includes power circuitry 570, which may include one or more voltage regulators. Additional circuitry may optionally be present depending on particular implementation to provide various functionality and interaction with external devices. Such circuitry may include interface circuitry 560 which may provide interface with various off-chip devices, sensor circuitry 540 which may include various on-chip sensors including digital and analog sensors to sense desired signals, such as speech inputs, image inputs, environmental inputs or so forth.

In addition as shown in FIG. 6, transceiver circuitry 580 may be provided to enable transmission and receipt of wireless signals, e.g., according to one or more digital radio communication standards such as DAB, DRM or HD™ radio, local area wireless communication schemes, such as a given IEEE 802.11 scheme, wide area wireless communication scheme such as LTE or 5G, among others. And as shown transceiver circuitry 580 includes a channel estimation circuit 585, which may determine channel estimates as described herein. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in a receiver, a radio frequency (RF) signal;
   processing, in the receiver, the RF signal to obtain a plurality of orthogonal frequency division multiplexing (OFDM) symbols, each of the plurality of OFDM symbols comprising a plurality of sub-carriers;
   computing a first pilot channel estimate for a first channel condition and a second pilot channel estimate for a second channel condition based on a first set of pilot sub-carriers of the plurality of sub-carriers;
   determining a first noise estimate using the first pilot channel estimate and a second set of pilot sub-carriers of the plurality of sub-carriers;
   determining a second noise estimate using the second pilot channel estimate and the second set of pilot sub-carriers;
   selecting one of the first pilot channel estimate and the second pilot channel estimate based at least in part on a comparison between the first noise estimate and the second noise estimate; and
   configuring at least a demodulator of the receiver based at least in part on the selected first or second pilot channel estimate.

2. The method of claim 1, further comprising computing the first pilot channel estimate for a flat channel.

3. The method of claim 2, further comprising computing the second pilot channel estimate for a selective channel.

4. The method of claim 3, further comprising selecting the one of the first pilot channel estimate and the second pilot channel estimate associated with a lower one of the first noise estimate and the second noise estimate.

5. The method of claim 1, further comprising computing a first data channel estimate based at least in part on the first pilot channel estimate and determining the first noise estimate further based on the first data channel estimate.

6. The method of claim 1, further comprising:
   determining the first pilot channel estimate using a plurality of gain reference pilot frequency domain sub-carriers having known modulation points; and
   determining the first noise estimate using a plurality of timing and frequency reference pilot frequency domain sub-carriers having known modulation points.

7. The method of claim 6, further comprising determining the first noise estimate further based on control channel frequency domain sub-carriers having quadrature phase shift keying modulation.

8. A non-transitory computer readable medium comprising instructions that when executed by a controller cause the controller to perform a method comprising:
   processing, in a receiver, a radio frequency (RF) signal to obtain a plurality of orthogonal frequency division multiplexing (OFDM) symbols, each of the plurality of OFDM symbols comprising a plurality of sub-carriers;
   computing a first pilot channel estimate for a first channel condition and a second pilot channel estimate for a second channel condition based on a first set of pilot sub-carriers of the plurality of sub-carriers;

determining a first noise estimate using the first pilot channel estimate and a second set of pilot sub-carriers of the plurality of sub-carriers;

determining a second noise estimate using the second pilot channel estimate and the second set of pilot sub-carriers;

selecting one of the first pilot channel estimate and the second pilot channel estimate based at least in part on a comparison between the first noise estimate and the second noise estimate; and configuring at least a demodulator of the receiver based at least in part on the selected first or second pilot channel estimate.

9. The non-transitory computer readable medium of claim 8, wherein the method further comprises computing the first pilot channel estimate for a flat channel.

10. The non-transitory computer readable medium of claim 9, wherein the method further comprises computing the second pilot channel estimate for a selective channel.

11. The non-transitory computer readable medium of claim 10, wherein the method further comprises selecting the one of the first pilot channel estimate and the second pilot channel estimate associated with a lower one of the first noise estimate and the second noise estimate.

12. The non-transitory computer readable medium of claim 8, wherein the method further comprises computing a first data channel estimate based at least in part on the first pilot channel estimate and determining the first noise estimate further based on the first data channel estimate.

13. The non-transitory computer readable medium of claim 8, wherein the method further comprises:

determining the first pilot channel estimate using a plurality of gain reference pilot frequency domain sub-carriers having known modulation points; and determining the first noise estimate using a plurality of timing and frequency reference pilot frequency domain sub-carriers having known modulation points.

14. An apparatus comprising:

a front end circuit to receive incoming radio frequency (RF) signals and process the incoming RF signals into orthogonal frequency division multiplexing (OFDM) samples of a plurality of OFDM symbols;

a fast Fourier transform (FFT) engine coupled to the front end circuit, the FFT engine to receive the plurality of OFDM samples and convert the plurality of OFDM samples into a plurality of frequency domain sub-carriers;

a demodulator coupled to the FFT engine to demodulate the plurality of frequency domain sub-carriers;

a channel estimator coupled to the FFT engine, wherein the channel estimator is to:

compute a first pilot channel estimate for a first channel condition comprising a flat channel condition and a second pilot channel estimate for a second channel condition comprising a selective channel condition based on a first set of pilot sub-carriers of the plurality of frequency domain sub-carriers; and select one of the first pilot channel estimate and the second pilot channel estimate using the first pilot channel estimate and the second pilot channel estimate; and a control circuit coupled to the channel estimator to configure at least the demodulator based at least in part on the selected first or second pilot channel estimate.

15. The apparatus of claim 14, wherein the channel estimator is to:

determine a first noise estimate using the first pilot channel estimate and a second set of pilot sub-carriers of the plurality of frequency domain sub-carriers; and determine a second noise estimate using the second pilot channel estimate and the second set of pilot sub-carriers.

16. The apparatus of claim 15, wherein the channel estimator is to select the one of the first pilot channel estimate and the second pilot channel estimate based at least in part on a comparison between the first noise estimate and the second noise estimate.

17. The apparatus of claim 15, wherein the channel estimator is to further select the one of the first pilot channel estimate and the second pilot channel estimate associated with a lower one of the first noise estimate and the second noise estimate.

18. The apparatus of claim 14, further comprising a decoder coupled to the demodulator, wherein the decoder is to decode demodulated symbols.

19. The apparatus of claim 14, wherein the demodulator is to calculate soft decisions.

20. The apparatus of claim 19, wherein the control circuit is to set a slicing threshold for the demodulator based at least in part on the on the selected first or second pilot channel estimate.

* * * * *